United States Patent
Anzai et al.

[19]
[11] Patent Number: 5,982,762
[45] Date of Patent: *Nov. 9, 1999

[54] WIRELESS LAN SYSTEM, BASE STATION DEVICE AND WIRELESS TERMINAL DEVICE THEREFOR, AND METHOD FOR RELAYING INFORMATION FRAME

[75] Inventors: Atsushi Anzai, Kanagawa-ken; Hidehiko Jusa, Kawasaki; Takaharu Aoyama, Atsugi; Kenichiro Orita, Hadano, all of Japan

[73] Assignees: Hitachi, Ltd, Tokyo; Hitachi Computer Engineering Co., Ltd., Kawagawa-ken, both of Japan

[*] Notice: This patent issued on a continued prosecution application filed under 37 CFR 1.53(d), and is subject to the twenty year patent term provisions of 35 U.S.C. 154(a)(2).

[21] Appl. No.: 08/618,138
[22] Filed: Mar. 19, 1996

[30] Foreign Application Priority Data

Mar. 20, 1995 [JP] Japan .................................. 7-060172

[51] Int. Cl.$^6$ .................................................. H04L 12/46
[52] U.S. Cl. ............................................ 370/338; 370/401
[58] Field of Search ..................................... 370/310, 313, 370/328, 338, 401–405, 349; 455/32.1, 54.1, 56.1, 33.1, 33.4, 435, 524; 379/59–62; 375/202

[56] References Cited

U.S. PATENT DOCUMENTS

| | | | |
|---|---|---|---|
| 5,159,592 | 10/1992 | Perkins | 370/401 |
| 5,339,316 | 8/1994 | Diepstraten | 370/401 |
| 5,353,331 | 10/1994 | Emery et al. | 379/58 |
| 5,371,738 | 12/1994 | Moelard et al. | |
| 5,490,139 | 2/1996 | Baker et al. | 370/401 |

FOREIGN PATENT DOCUMENTS 4-249443  9/1992  Japan .

OTHER PUBLICATIONS

IEEE STD802.1D–1990 "Medial Access Control Bridges", pp. 31–47, 1991.
International Standard (ISO/IEC 8802–2), pp. 43–47, 1987.
Local Area Networks: Logical Link Control (ISO/IEC 8802–2), p. 43–47, 1992.

*Primary Examiner*—Chau Nguyen
*Attorney, Agent, or Firm*—Beall Law Offices

[57] ABSTRACT

In a wireless LAN system, each wireless terminal device determines whether or not the wireless terminal device has entered into a wireless LAN domain established by a base station, and if it has entered, transmits an entry terminal identification information update control frame including identification information of its own device to the base station at a predetermined time interval. The base station receives the entry terminal identification information update control frame from the wireless terminal device, stores in a storage the identification information of the wireless terminal device entered into the wireless LAN domain established by its own base station, and when it receives an information frame from a wired transmission line connected to its own base station, relay-transmits only the information frame to the wireless terminal device having the identification information thereof stored in the storage by referring the information stored in the storage.

13 Claims, 7 Drawing Sheets

FDB UPDATE CONTROL FRAME (NP-MAC FRAME)

FDB REGISTRATION REJECTION FRAME (REMOVE-MAC FRAME)

WIRELESS LAN SYSTEM, BASE STATION DEVICE AND WIRELESS TERMINAL DEVICE THEREFOR, AND METHOD FOR RELAYING INFORMATION FRAME

CROSS-REFERENCE TO RELATED APPLICATION

This application relates to U.S. Ser. No. 08/206,485 filed on Mar. 4, 1994, now U.S. Pat. No. 5,655,219, and assigned to the present assignee, the disclosure of which is hereby incorporated by reference.

BACKGROUND OF THE INVENTION

1. Field of the Invention

The present invention relates to a wireless LAN (Local Area Network) system, and more particularly to a wireless LAN system in which a base station and a wireless terminal device in a cell (wireless LAN domain) communicate to each other by using a spread spectrum system, a base station device and a wireless terminal device therefor, and a method for relaying an information frame.

2. Description of the Related Art

A wireless LAN system in which a base station and a wireless terminal device communicate to each other by using a spread spectrum system has been known.

A wireless LAN system in which a wired LAN is connected to the base station of such a wireless LAN system to allow intercommunication between the wireless terminal device and the wired LAN terminal device has also been known. Such a wireless LAN system is disclosed in JP-A-4-249443.

In the wireless LAN system which allows the interconnection of the wired LAN and the wireless LAN, it is necessary for the base station to determine whether a terminal which transmitted a user frame (information frame) is present in the wireless LAN or in the wired LAN and relay it to a designated destination terminal device.

For this purpose, a wireless LAN system which realizes the relay of the information frame by a bridge function has been proposed. Such a system is disclosed in IEEE Std 802.1D-1990 "Media Access Control Bridges", pp 31–47. Entry terminal information, that is, filtering database (FDB) is provided in the wireless LAN system to realize the bridge function. When the base station receives a user frame from the wireless LAN or the wired LAN, it stores a source address of the user frame in the FDB to identify whether the terminal which transmitted the user frame is present in the wireless LAN or in the wired LAN. When the base station receives a user frame, it compares a destination address thereof with the address registered in the FDB to relay or discard the user frame.

Namely, when the base station receives a new user frame from the wired LAN and the destination address has been registered as being present in the wired LAN, it discards the received frame, and if it has not been registered, the base station relays the received frame to the wireless LAN. Similarly, when the base station receives a new user frame from the wireless LAN and the destination address thereof has been registered as being present in the wireless LAN, it discards the received frame, and when it has not been registered, the base station relays the received frame to the wired LAN.

In this case, if a frame is transmitted from a non-registered terminal while a total number of addresses (specifically MAC (media access control) addresses) registered in the FDB in the base station has reached an upper limit of the total number of the MAC addresses registerable in the FDB in the base station, or if a frame is transmitted from a terminal which is not authorized to be registered in the FDB in the base station, the base station does not register the MAC address of that terminal in the FDB but discards the frame.

Accordingly, unless the same MAC address as the destination address of the user frame newly received from the wired LAN has been registered in the FDB of the wired LAN, the received frame is relayed whether or not the destination terminal is present in the wired LAN or the wireless LAN. Thus, when the destination terminal is not present in the wireless LAN, the wireless transmission line is wastefully occupied and a transmission efficiency of the wireless transmission line is lowered.

Further, when a wireless terminal device not registered in the FDB transmits a user frame to a terminal connected to the wired LAN, the frame is discarded by the base station and wasteful communication is conducted.

A terminal which is not authorized to be registered in the FDB in the base station cannot communicate with another terminal via the base station but it can communicate directly with another terminal in the same cell. In general, in the wireless LAN system, the communication between more than two terminals or between at least a terminal and a base station is permitted at a time within one cell. Accordingly, when a terminal not authorized for registration conducts the communication in the cell, normal terminal communication may be disturbed.

SUMMARY OF THE INVENTION

It is an object of the present invention to provide a wireless LAN system which can relay an information frame between terminals present in a wired LAN and a wireless LAN, a base terminal device and a wireless terminal device therefor, and a method for relaying the information frame.

In accordance with the present invention, in order to achieve the above object, each wireless terminal device determines whether its own device is within a wireless LAN domain established by the base station or not, and if it is within the domain, the wireless terminal device transmits an entry terminal identification information update control frame including identification information of its own device to the base station at a predetermined time interval. The base station receives the entry terminal identification information update control frame from the wireless terminal device and stores it in storage means for storing identification information of the wireless terminal device which is the entry into the wireless LAN domain established by its own base station, and when it subsequently receives an information frame from a wired transmission line connected to its own base station, it refers the stored information of the storage means and relays only the information frame addressed to the wireless terminal device whose identification information has been stored.

Further, when the base station receives the entry terminal identification information update control frame, it determines whether the number of identification information stored in the storage means has reached a predetermined upper limit or not, and if it has reached the upper limit, it transmits a reject to register frame of the identification information in the reception frame to the wireless terminal device.

Further, when the base station receives the entry terminal identification information update control frame, the base station determines whether the identification information in the reception frame is in the identification information list of the preset registration authorized terminals or the preset registration inhibited terminals, and if the identification information is not allowed to be registered, the base station transmits the registration rejection frame to the wireless terminal device.

In accordance with the wireless LAN system of the present invention, the base station compares the user frame addressed to the wireless terminal device received from the wired transmission line with the identification information stored in the storage means and relays only the information frame addressed to the wireless terminal device registered in the storage means.

Accordingly, the user frame addressed to other than the wireless terminal device present in the cell established by the base station is not relayed to the wireless transmission line.

Further, for the wireless terminal device having the identification information thereof not registered in the storage means in the base station, the reject to register frame is provided. Thus, the communication by that terminal device in the cell established by the base station is inhibited.

As a result, the relay transmission of the information frame from the wired transmission line to the wireless LAN in spite of the absence of the destination terminal in the wireless LAN is prevented and the transmission efficiency of the wireless transmission line is prevented.

Further, since the communication between the wireless terminal devices having the identification information thereof not registered in the base station is inhibited, the communication of the wireless terminal device having the identification information thereof registered is not impeded.

DESCRIPTION OF THE PREFERRED EMBODIMENTS

The embodiments of the present invention are now explained with reference to the drawings.

Figure 1:
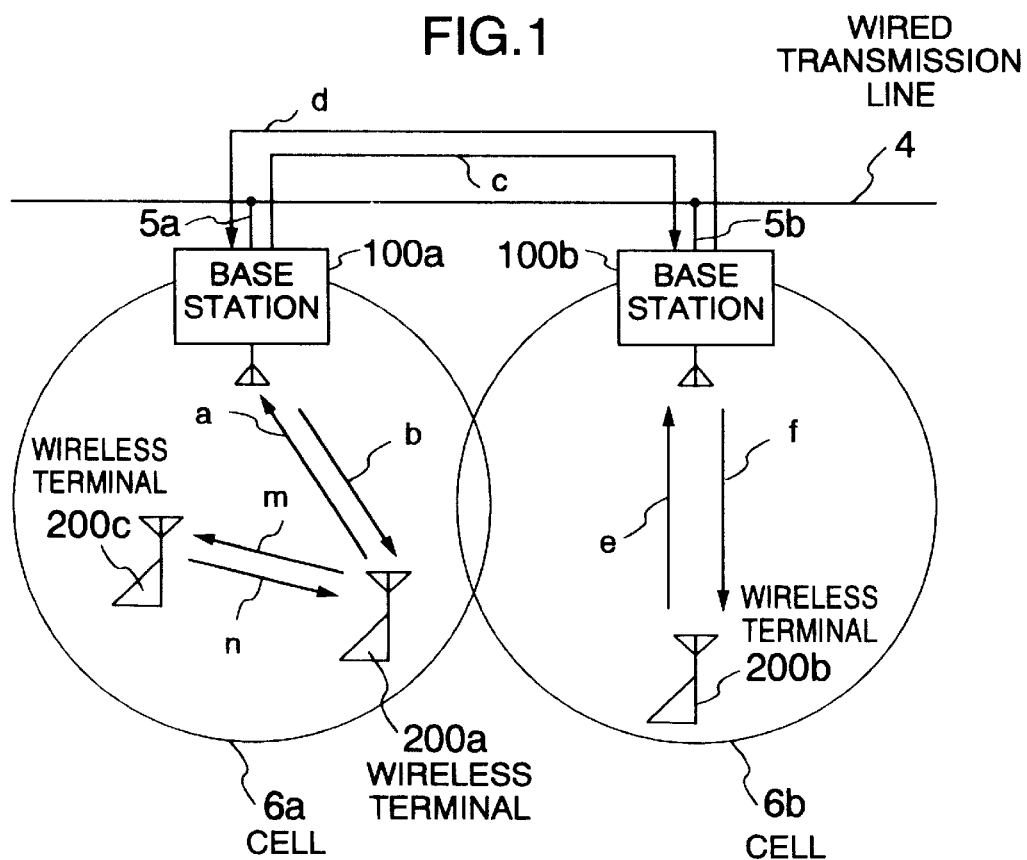
FIG. 1 shows an overall configuration of an embodiment of a wireless LAN system in accordance with the present invention.

FIG. 1 shows an overall configuration of an embodiment of a wireless LAN system in accordance with the present invention.

The wireless LAN system of FIG. 1 comprises base stations 100a and 100b, wireless terminal devices 200a, 200b and 200c and a wired transmission line 4 for conducting communication between the base stations 100a and 100b.

The base stations 100a and 100b are wire-connected to the wired transmission line 4 by connectors 5a and 5b, respectively. Numerals 6a and 6b denote cells (wireless LAN domains) which are control areas of the base stations 100a and 100b, respectively.

The base station 100a and the wireless terminal devices 200a, 200b and 200c in the cell 6a are configured to conduct the intercommunication of user frames by using a spread spectrum system, and the communication between the base station 100a and the wireless terminal device 200a in the cell 6a is conducted by using a path a or a path b, and the communication between the base stations 100a and 100b connected through the wired transmission line 4 is conducted by using a path c or a path d.

The communication between the base station 100b and the wireless terminal device 200b in the cell 6b is conducted by using a path e or a path f, and the communication between the wireless terminal device 200a and the wireless terminal device 200c in the same cell 6a is conducted by using a path m or a path n.

Figure 2:
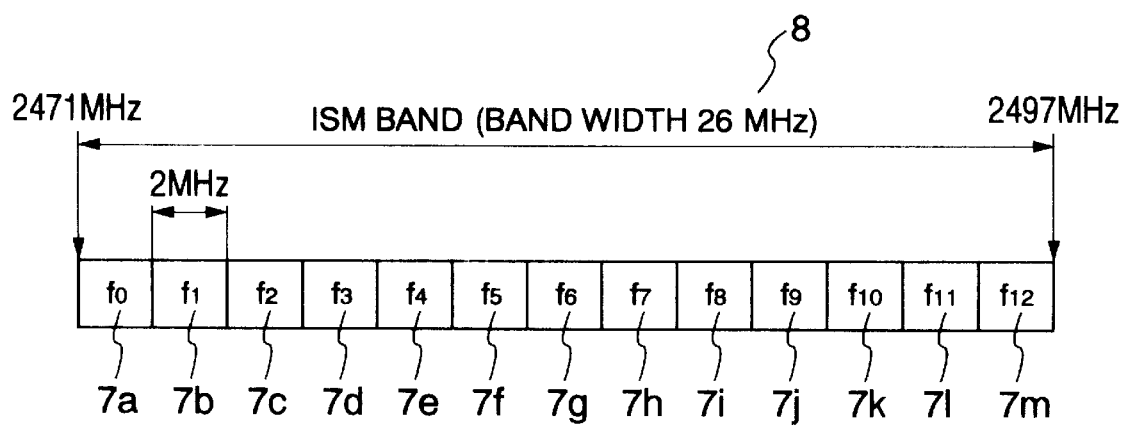
FIG. 2 illustrates allocation of a carrier frequency.

FIG. 2 shows allocation of a carrier frequency used in the wireless LAN system. In the present example, an ISM band 8 of 2471~2497 MHz having a band width of 26 MHz is allocated. The ISM band 8 is divided to 13 sub-channels 7a~7m each having a width of 2 MHz so that a center frequency of each carrier frequency is Fi=2472+2i MHz (i=0, . . . , 12). In the base stations 100a and 100b and the wireless terminal devices 200a, 200b and 200c, the operating carrier frequencies are periodically changed or hopped.

Figure 3:
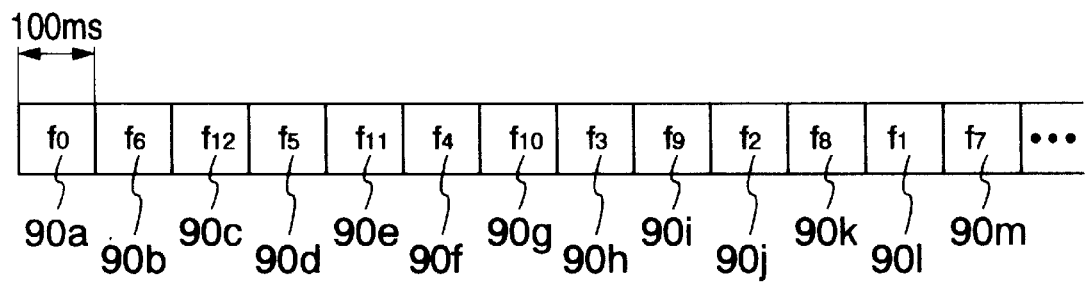
FIG. 3 shows a frequency hopping pattern.

FIG. 3 shows an example of a frequency hopping pattern. In the present embodiment, the hopping frequency is 100 ms and the number of hops is 13 so that the sub-channels 7a~7m are hopped in accordance with the frequency hopping pattern with the carrier frequencies 90a~90m being repeated.

Figure 4:
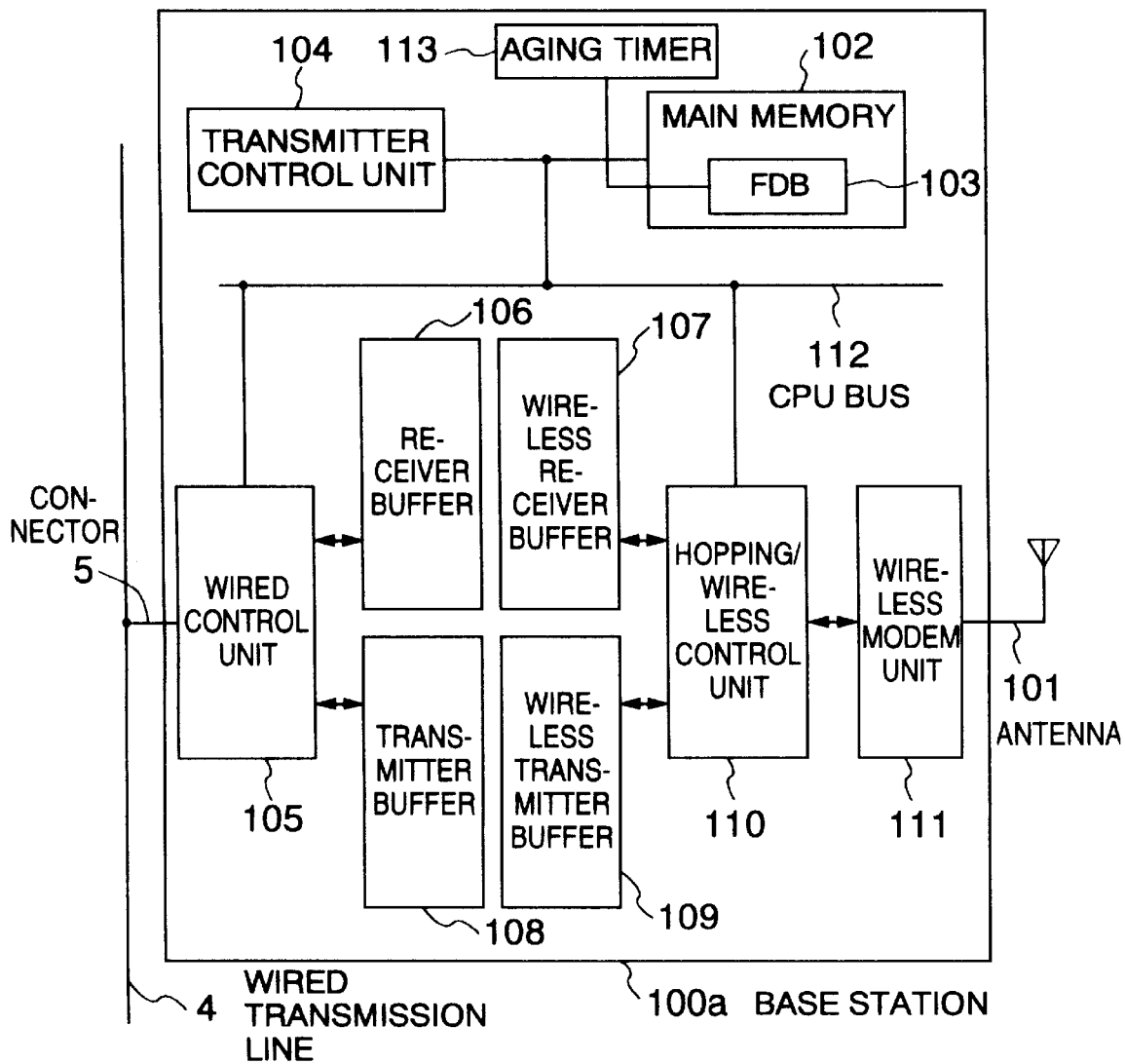
FIG. 4 shows a block diagram of a configuration of a base station.

FIG. 4 shows a block diagram of the base station 100a as a representative of the base stations 100a and 100b.

The base station 100a comprises an antenna 101, a main memory 102, an FDB 103, a transmitter/receiver control unit 104, a wired control unit 105, a receiver buffer 106, a wireless receiver buffer 107, a transmitter buffer 108, a wireless transmitter buffer 109, a hopping/wireless control unit 110, a wireless modem unit 111, a CPU bus 112 and an aging timer 113. It is wire-connected to the wired transmission line 4 by the connector 5. The filtering database (FDB) 103 as storage means for storing the wireless terminal identification information (MAC address) in an FDB update control frame (to be described later) received from the wireless terminal devices 200a and 200c is provided in the main memory 102. The transmitter/receiver control unit 105 and the hopping/wireless control unit 110 includes one or more microprocessor and software programs and buffers 106–109 are formed by the main memory.

The wired control unit 105 controls the transmission/reception for the wired transmission line 4, the hopping/wireless control unit 110 controls the transmission/reception for the wireless transmission line, and the transmission/reception control unit 104 controls the transmission/reception such as transmission command of a frame. The communication such as a transmission/reception frame between the transmitter/receiver control unit 104, the hopping/wireless control unit 110 and the wired control unit 105 is conducted via the CPU bus 112.

The wireless modem unit 111 conducts the modulation process and the frequency conversion process to 2.4 GHz for the frame transmitted from the hopping/wireless control unit 110, transmits it from the antenna 101, conducts the frequency conversion process to the base band and the demodulation process for the frame received from the antenna 101 and transmits it to the hopping/wireless control unit 110.

The aging timer 113 erases the MAC address stored in the FDB 103 a predetermined time later, for example, five minutes later.

Figure 5:
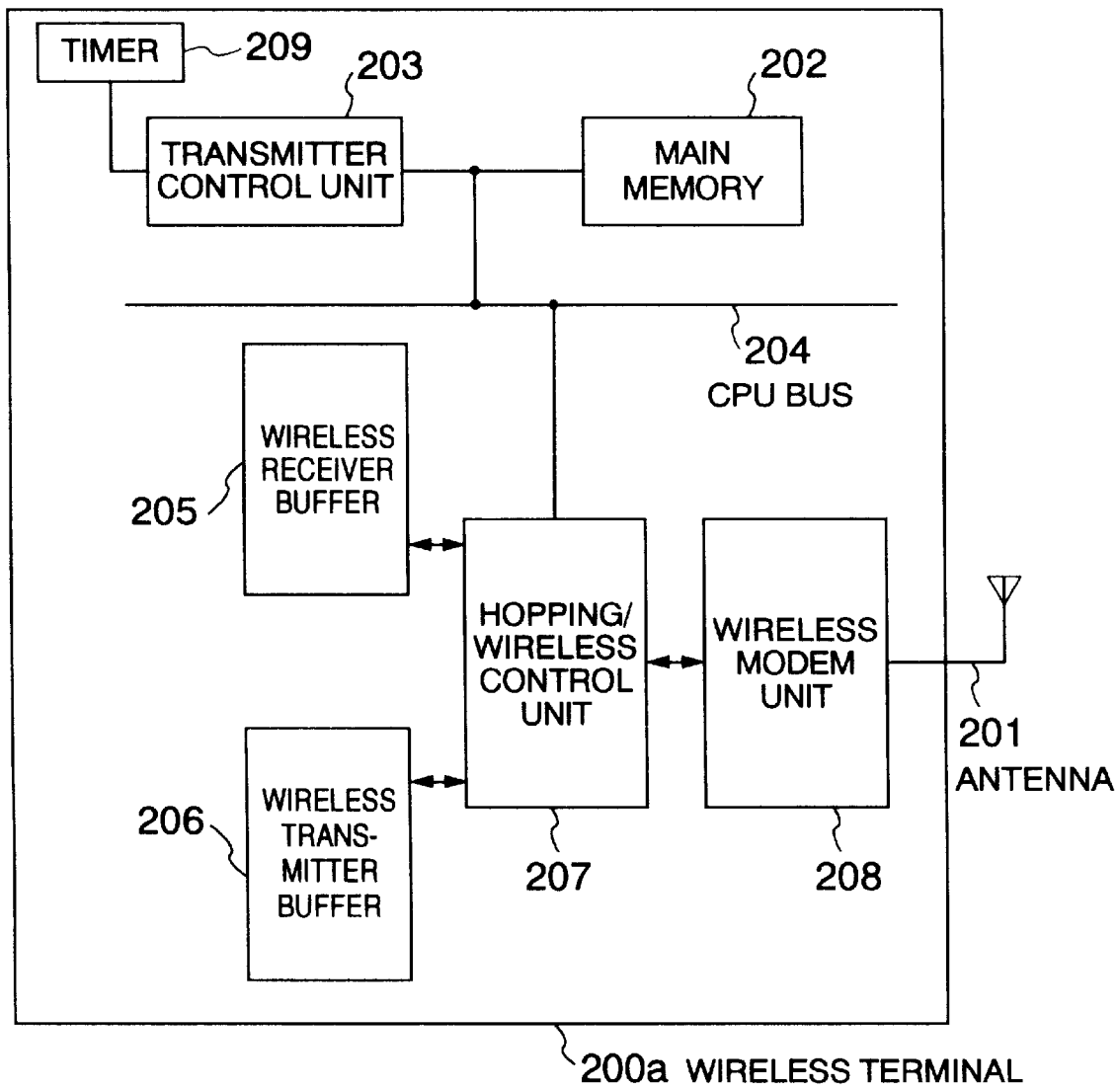
FIG. 5 shows a block diagram of a configuration of a wireless terminal.

FIG. 5 shows a block diagram of the wireless terminal device 200a which represents the wireless terminal devices 200a, 200b and 200c. The wireless terminal device 200a comprises an antenna 201, a main memory 202, a transmitter/receiver control unit 203, a CPU bus 204, a wireless receiver buffer 205, a wireless transmitter buffer 208, a hopping/wireless control unit 207, a wireless modem unit 208 and a timer 209 for determining a transmission time interval (for example, 30 seconds) of the FDB update control frame.

The transmitter/receiver control unit 203 and the hopping/wireless control unit 207 comprises one or more microprocessor and software program and the buffers 205~206 are formed by the main memory.

The hopping/wireless control unit 207 controls the transmission/reception for the wireless transmission line and the transmitter/receiver control unit 203 controls the transmission/reception of the transmission/reception command of the frame. The communication such as the transmission/reception frame between the transmitter/receiver control unit 203 and the hopping/wireless control unit 207 is conducted via the CPU bus 204. The wireless modem unit 208 conducts the modulation process and the frequency conversion process to 2.4 GHz for the frame transmitted from the hopping/wireless control unit 207 and transmits it from the antenna 201, and conducts the frequency conversion process to the base band and the demodulation process for the frame received from the antenna and transmits it to the hopping/wireless control unit 207.

Figure 6:
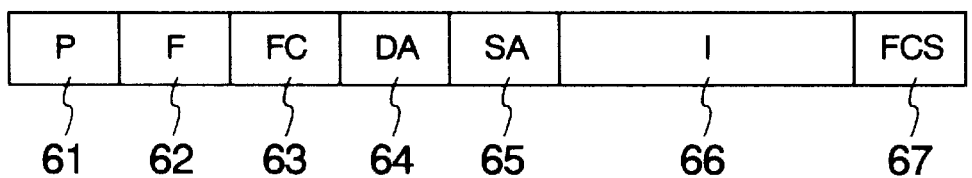
FIG. 6 shows a frame format on a wireless transmission line.

FIG. 6 shows a frame format used in the wireless transmission line. A field P 61 is a dummy field for establishing and maintaining the synchronization in a physical layer. A field F 62 is arranged to follow the field P 61 and indicates a substantial head of effective information in the frame. A field FC 63 is a frame control field which holds identification information of a user frame and a wireless control frame. When the base station 100a is to inform hopping information is to the wireless terminal device 200a under control, it sets hopping control information in the field FC 63 to conduct the communication.

A field DA 64 indicates a destination address and a field SA 65 indicates a source address. A field I 66 is an information field. A field FC 67 indicates a frame check sequence and it is used to detect an error in the entire frame excluding the field P 61 by using a CRC code which is an error detection code.

On the other hand, on the wired transmission line 4, a frame format which may comply with the IEEE 802.3 or the Ethernet V2.0 is used as a frame format. An example which complies with the IEEE 802.3 is explained here.

Figure 7:
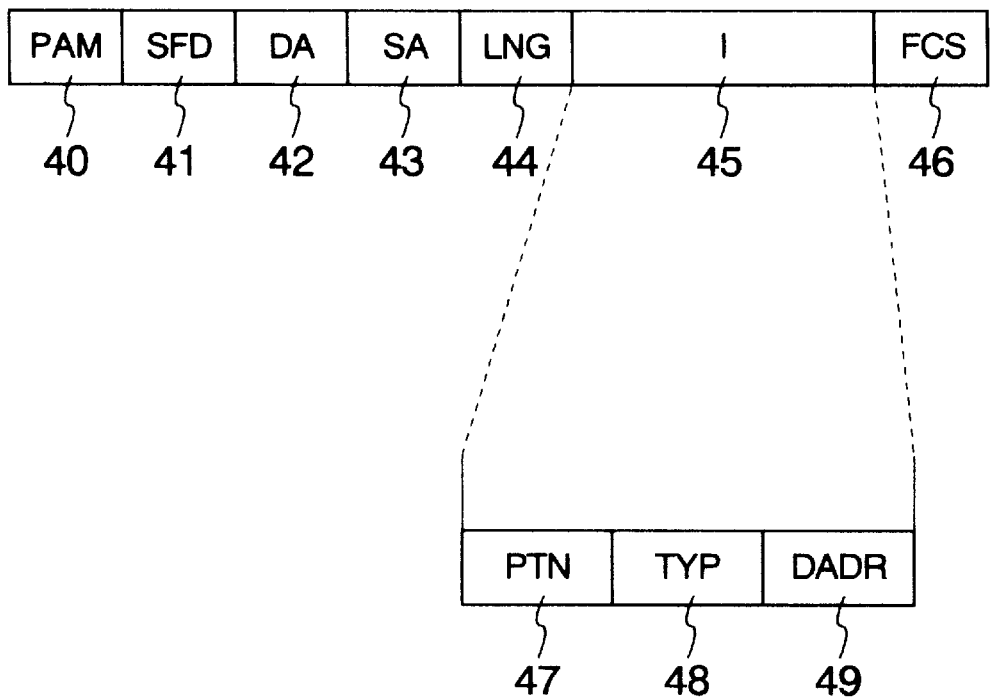
FIG. 7 shows a frame format on a wired transmission line.

FIG. 7 shows a frame format which complies with the IEEE 802.3. A field PAM 40 is a field for establishing and maintaining synchronization in the physical layer. A field SFD 41 indicates a substantial head of effective information in the frame. A field DA 42 indicates a destination address and a field SA 43 indicates a source address. A field LNG 44 indicates a length of a field I 45 which is an information field. A field FCS 46 indicates a frame check sequence and it is used to detect an error in the entire frame excluding the PAM 40 and the SFD 41. The information field I 45 comprises PTN 47, TYP 48 and DADR 49. The PTN 47 is used to distinguish a conventional frame from the DFDB frame (wired control frame to be described later) and it may contain a 802.2 LLC header which defines a SAP (service access point). The TYP 48 is used to store information to command the deletion of the FDB, and the DADR 49 is used when the MAC address of the wireless terminal device which is to be deleted from the FDB 103 in the base station 100 is to be stored.

Figure 8:
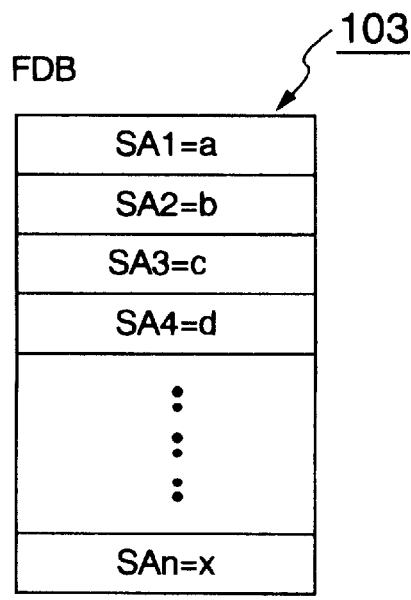
FIG. 8 shows an example of information stored in an FDB.

FIG. 8 shows an example of the MAC address stored in the FDB 103 of the base station, specifically the MAC address of the wireless terminal device which transmitted the FDB update control frame. The source address SA in the FDB update control frame is extracted and the MAC address is registered, for example, SA1=a, SA2=b.

In the above construction, for the base station 100a, a frame is received from the wireless transmission line via the path a and it is transmitted to the wireless transmission line via the path b as shown in FIG. 1. Further, a frame is received from the wired transmission line 4 via the path d and it is transmitted to the wired transmission line 4 via the path c. Operations are explained for the respective cases.

(1) Reception Process from the Wireless Transmission Line of the Base Station 100a The reception process from the wireless transmission line in the base station is conducted in the following manner.

The communication in the wireless section is conducted in the frame format shown in FIG. 6. First, the frame received by the antenna 101 is temporarily stored in the wireless receiver buffer 107 via the wireless modem unit 111 and the hopping/wireless control unit 110. The hopping/wireless control unit 110 refers the FDB 103 in the main memory 102 and the received frame to conduct the following process.

If the frame control field FC 63 of the received frame indicates a user frame and the destination address DA 64 of the received frame is not present in the FDB 103, the frame is determined to be a user frame which is to be relayed to the wired transmission line 4. In this case, the frame is converted to the frame format used on the wired transmission line 4 by the wired control unit 105 from the wireless receiver buffer 107 through the hopping/wireless control unit 110 and the CPU bus 112 and it is stored in the transmitter buffer 108. Thereafter, as soon as the wired transmission line 4 becomes vacant, the wired control unit 105 extracts the frame from the transmitter buffer 108 and transmits it to the wired transmission line 4 through the connector 5.

When the frame control field FC 63 of the received frame indicates the control frame, the frame is determined to be the wireless control frame. In this case, after the hopping/wireless control unit 110 extracts necessary information from the wireless control frame, the frame is discarded. Such a wireless control frame includes the FDB update control frame. The frame which does not correspond to either one is discarded by the hopping/wireless control unit 110.

(2) Reception Process from the Wired Transmission Line 4 in the Base Station 100a In the base station 100a, the reception process from the wired transmission line 4 is conducted in the following manner. The communication on the wired transmission line 4 is conducted in the frame format of FIG. 7.

First, the frame transmitted from the wired transmission line 4 is temporarily stored in the receiver buffer 106 through the connector 5 and the wired control unit 105.

The wired control unit 105 refers the FDB 103 in the main memory 102 and the received frame to conduct the following process.

When the PTN 47 of the received frame indicates a user frame and the destination address DA 42 is present in the FCB 102, that frame is determined to be the user frame to be relayed to the wireless transmission line. In this case, the frame is stored in the wireless transmitter buffer 109 from the receiver buffer 106 through the wired control unit 105, the CPU bus 112 and the hopping/wireless control unit 110. In this case, the hopping/wireless control unit 110 converts the frame to the frame format on the wireless transmission line shown in FIG. 6 and stores it. Thereafter, the transmission/reception control unit 104 transmits the transmission/reception command signal to the hopping/wireless control unit 110 through the CPU bus 112. The hopping/wireless control unit 110 extracts the frame from the wireless transmitter buffer 109 and transmits it to the wireless transmission line through the wireless modem unit 111 and the antenna 101.

When the PTN 47 of the received frame indicates the control frame, the frame is determined to be the wired control frame. In this case, the wired control unit 105 extracts necessary information from the wired control frame, processes it and then discards it. Such a wired control frame may include an FDB delete frame to be described later.

The frame which does not corresponds to either one is discarded by the wired control unit.

(3) Transmission Process of the Wired Control Frame in the Base Station 100a

When the base station 100a transmits the wired control frame, the transmission/reception control unit 104 generates the wired control frame in the main memory 102, and the wired control unit 105 converts it to the frame format of FIG. 7 through the CPU bus 112 and the wired control unit 105 and then stores it in the transmitter buffer 108.

Thereafter, as soon as the wired transmission line 4 becomes vacant, the frame is transmitted to the wired transmission line 4 by the wired control unit 105 from the transmitter buffer 108 through the wired control unit 105 and the connector 5.

An example of generating the wired control frame by the base station is the transmission of the FDB delete frame (to be described later) to another base station.

(4) Transmission Process of the Wireless Control Frame to the Wireless Transmission Line of the Base Station 100a The transmission process of the wireless control frame to the wireless transmission line of the base station 100 is conducted in the following manner.

The hopping/wireless control unit 110 generates the wireless control frame in the wireless transmitter buffer 109 in the frame format on the wireless transmission line shown in FIG. 6. The hopping/wireless control unit 110 transmits it to the wireless transmission line from the wireless transmitter buffer 109 through the wireless modem unit 111 and the antenna 101 by the transmission command of the transmission/reception control unit 104.

An example of generating the wireless control frame by the base station is the transmission of the hopping control frame and an FDB registration rejection frame (to be described later) to the wireless terminal in the cell.

The transmission/reception process of the wireless terminal device 200a is now explained.

As shown in FIG. 1, for the wireless terminal device 200a, a frame is received from the wireless transmission line via the path b or the path n and the frame is transmitted to the wireless transmission line via the path a or the path m. The respective cases are explained below.

(5) Reception Process of the Wireless Terminal Device 200a

The reception process of the wireless terminal device 200a is conducted in the following manner.

First, the communication on the wireless transmission line is conducted in the frame format shown in FIG. 6, and the frame received by the antenna 201 is temporarily stored in the wireless receiver buffer 205 through the wireless modem unit 208 and the hopping/wireless control unit 207. The hopping/wireless control unit 207 refers the frame control field FC 63 of the received frame to discriminate the user frame from the wireless control frame. For the user frame, it is stored in the main memory 202 from the wireless receiver buffer 205 through the hopping/wireless control unit 207 and the CPU bus 204 and it is delivered to host software of the wireless terminal device 200a. (While not shown in FIG. 5, the wireless terminal device has a CPU for the host software processing.)

For the wireless control frame, the hopping/wireless control unit 207 extracts necessary information from the wireless control frame, processes it and then discards it. When it does not correspond to either one, the frame is discarded by the hopping/wireless control unit 207.

(6) Transmission Process of the Frame of the Wireless Terminal Device 200a

The transmission process of the wireless control frame and the user frame to the wireless transmission line of the wireless terminal device 200a is conducted in the following manner. The hopping/wireless control unit 207 generates the wireless control frame or the user frame in the wireless transmitter buffer 206 in the frame format on the wireless transmission line shown in FIG. 6. The hopping/wireless control unit 207 extracts the frame from the wireless transmitter buffer 206 through the wireless modem unit 208 and the antenna 201 and transmits it to the wireless transmission line by the transmission command of the transmission/reception control unit 203.

Figure 9:
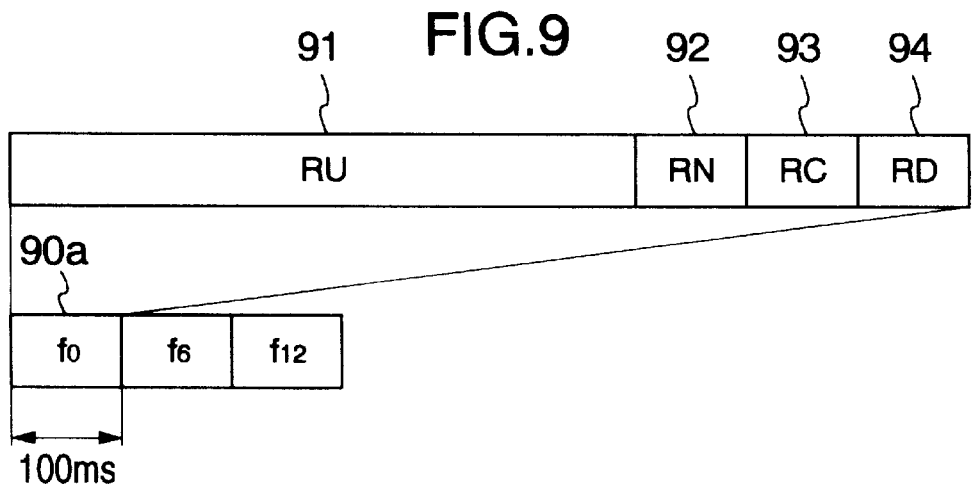
FIG. 9 shows a content of the carrier frequency.

FIG. 9 shows a content transmitted in the hopping period of the carrier frequency 90a used in the wireless transmission line. The hopping period of the carrier frequency 90a is 100 ms and it includes a user frame field RU 91, a non-transmission field RN 92, a wireless control frame field RC 93 and a dummy field RD 94.

In the user frame field RU 91, the user data is transmitted and received by using the user frame. The user frame field comprises a plurality of user frames. The non-transmission field 92 is provided to avoid collision of a user frame transmitted in the user frame field and a wireless control frame transmitted in the next wireless control frame field RC 93. The user frame is not transmitted during the non-transmission field RN 92. The wireless control frame field RC 93 transmits out the wireless control frame carrying information necessary for the hopping control. The wireless control frame field comprises a plurality of wireless control frames. The base station 100a utilizes the wireless control frame field RC 93 to transmit the wireless control frame to the wireless terminal device 200a in the cell 6a and conducts the control of the hopping.

The dummy field RD 94 secures a time necessary for switching a synthesizer. The carrier frequency is switched during this field.

A method for structuring the FDB 103a in the base station 100a is now explained.

When the base station is already in the normal operation state, the base station 100a transmits the hopping control frame carrying information necessary for hopping (hereinafter referred to as FH-MAC (frequency hopping media access control) frame) to the wireless control frame field RC 93 of FIG. 9 at an interval of 100 ms.

When power is turned on in the wireless terminal device 200a, the wireless terminal device 200a receives FH-MAC frame and acquires a frequency hopping pattern with the carrier frequencies being repeated as shown in FIG. 3. As the wireless terminal device 200a receives the FH-MAC frame, it recognizes the inclusion into the cell 6a. Thus, the wireless terminal device 200a generates the FDB update control frame (hereinafter referred to as NP-MAC (node presence-media access control) frame) having the FDB update control information set in the frame field FC 63 of FIG. 6, the MAC address of the base station 100a set in the field DA 64 and the MAC address of the wireless terminal device 200a set in the field SA 65, and transmits it to the base station 100a via the path a.

Figure 11:
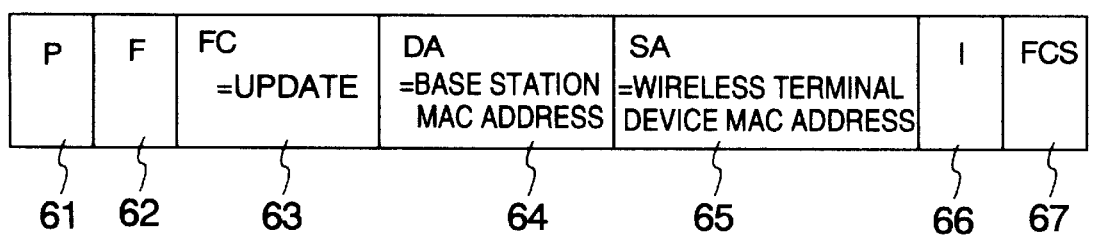
FIG. 11 shows a format of an FDB update control frame.

As shown in FIG. 11, the NP-MAC frame is one of wireless control frames and the MAC address of FC 63=update and DA 64=base station 100a, and the MAC address of SA 65=wireless terminal device 200a are set.

The NP-MAC frame of FIG. 11 is periodically transmitted from the wireless terminal device 200a to the base station 100a via the path a at an interval (for example, 30 seconds) shorter than the time-out of the aging timer 113 of the base station 100a.

The aging timer 113 servers to delete the MAC address of the wireless terminal device 200a from the FDB 103 after the elapse of a predetermined time interval (for example, five minutes). A plurality of MAC addresses are registered in the FDB 103 and the elapsed time from the write time is monitored by the aging timer 113 for each MAC address, and the MAC address for which the update is not required for more than the predetermined time (for example, five minutes) is deleted from the FDB 103 as it is regarded as being isolated from the cell of the base station 100a or the power was shut off.

When the base station 100a receives the NP-MAC frame of FIG. 11, it recognizes the MAC address of the wireless terminal device 200a which is the source of the frame transmission from the field SA 65 of the NP-MAC frame. It searches the MAC address of the wireless terminal device 200a in the FDB 103a, and if it is not registered therein, it registers the MAC address of the wireless terminal device 200a in the FDB 103a and starts the aging timer unit for the wireless terminal device 200a of the aging timer 103. If it has been registered, it restarts the aging timer unit for the wireless terminal device 200a.

In this manner, the NP-MAC frame is periodically transmitted from the wireless terminal device 200a located in the cell 6a of the base station 100a at a time interval (for example, every 30 seconds) shorter than the time-out time of the aging timer 103 so that the MAC address is registered in the FDB 103 on the assumption that the wireless terminal device 200a is present in the cell 6a of the base station 100a.

On the other hand, if the wireless terminal device 200a is not present in the cell 6a of the base station 100a or the power is shut off, the MAC address of the wireless terminal device 200a is deleted from the FDB 103 after the elapse of the time-out time of the aging timer 103 from the last transmission time of the NP-MAC frame.

Assuming that the wireless terminal device 200a receives a user frame having the MAC address of the wireless terminal device 200b set in the field DA 64 of FIG. 8 and the MAC address of the wireless terminal device 200a set in the field SA 65 (hereinafter referred to as a user frame (1)), the base station 100a receives it via the path a of FIG. 10.

The base station 100a recognizes the MAC address of the wireless terminal device 200b from the field DA 64 of the user frame (1), and if the MAC address has been registered in the FDB 103 in the main memory 102a of the base station 100a, the base station 100a need not relay it and it discards the user frame (1). If it has not been registered, the base station 100a recognizes that the destination terminal is located on the wired transmission line or on other wireless transmission line via the wired transmission line 4 and transmits the user frame (1) to the wired transmission line 4. In this case, the frame format shown in FIG. 7 is used.

When the base station 100b receives the user frame (1) via the path c, it extracts the MAC address of the wireless terminal device 200b from the field DA 42 of the user frame (1), searches it from the FDB 103b in the main memory 102b, and if it has not been registered, the base station 100b recognizes that the wireless terminal device 200b is not present in the cell 6b of the base station 100b or the power is shut off and discards the received user frame (1).

If it has been registered, the base station 100b transmits the user frame (1) received via the path c to the wireless terminal device 200b via the path f by using the frame format of FIG. 6.

In this manner, the user frame (1) from the wired transmission line 4 is relayed to the wireless terminal device 200b only when the wireless terminal device 200b is present in the cell 6b of the base station 100b, and the user frame (1) is discarded and not relayed when the wireless terminal device 200b is not present in the cell 6b of the base station 100b or the power is shut off. As a result, the transmission of the user frame addressed to the non-existing or non-operating wireless terminal device is prevented and the reduction of the transmission efficiency of the wireless transmission line is prevented.

A function to limit the registration of the MAC address of the wireless terminal device 200 to the FDB 103 is now explained.

In this function, when the total number of MAC addresses of the wireless terminal device registered in the FDB 103a in the base station 110a has reached the upper limit of the total number of MAC addresses registerable in the FDB 103a in the base station 100a and when a request is made to register the MAC address of its own to the FDB 103a from the wireless terminal device in the cell 6a, or when a request is made to register the MAC address of its own to the FDB 103a in the base station 100a from the wireless terminal device which is not authorized as being registered to the FDB 103a in the base station 100a, the base station 100a transmits back the FDB registration rejection frame to the wireless terminal device which transmitted the frame requesting the MAC address registration in order to prevent it from joining the cell 6a of the base station 100a.

The upper limit of the total number of MAC addresses registerable to the FDB 103a is preset by a manager of the wireless LAN system. The MAC address of the wireless terminal device which is authorized for the registration to the FDB 103a is also predetermined by the manager and stored in a table in the base station 100a. The designation of the wireless terminal device which is authorized for the registration to the FDB 103a is for the purpose of prevention of unauthorized entry of a third party into the wireless LAN system to destroy the integrity of security.

Figure 10:
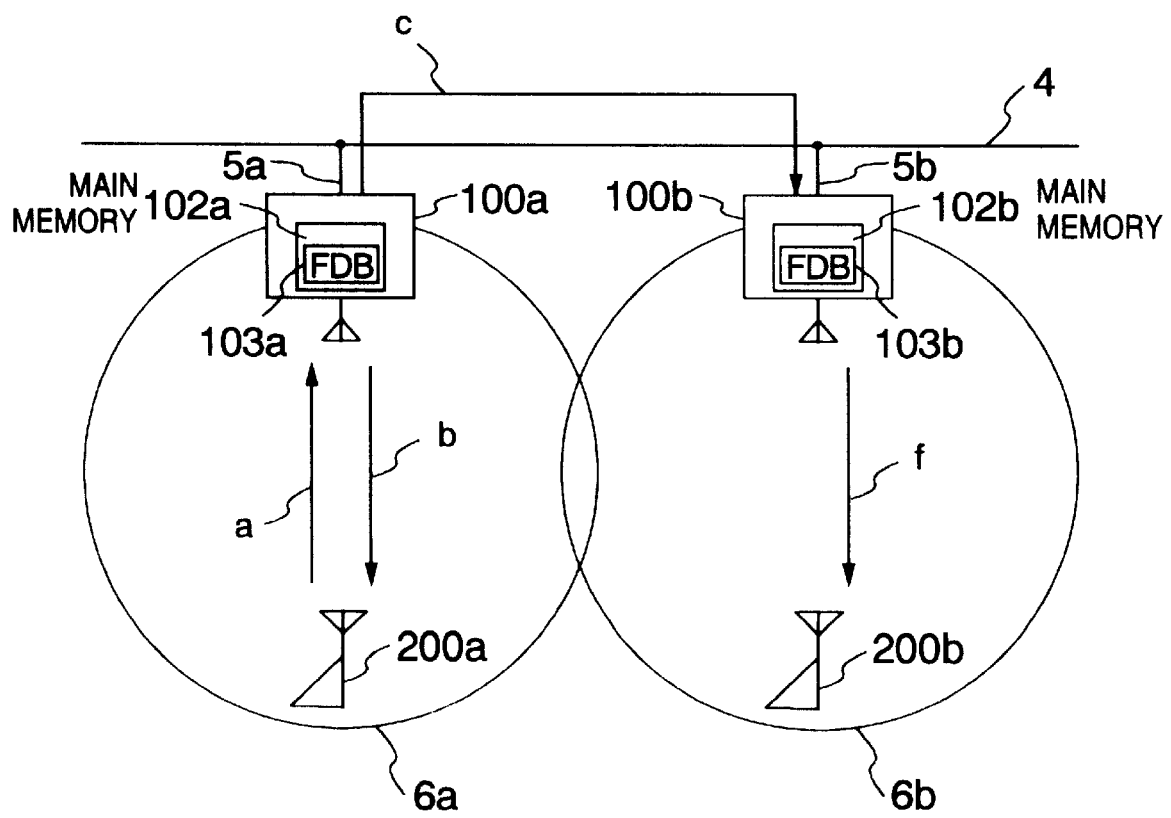
FIG. 10 shows a frame receiving operation.

In FIG. 10, the wireless terminal device 200a receives the FH-MAC frame transmitted by the base station 100a via the path b and enters into the cell 6a established by the base station 100a. When the wireless terminal station 200a completes the entrance procedure to the cell 6a, it transmits the NP-MAC frame to the base station 100a via the path a in order to register the MAC address of the wireless terminal device 200a to the FDB 103a in the base station 100a.

When the total number of the MAC address registered in the FDB 103a in the base station reaches the upper limit of the total number of MAC addresses registerable to the FDB 103a in the base station and when a request is made to register the MAC address of the wireless terminal device 200a to the FDB 103a in the base station from the wireless terminal station 200a or when a request is made to register the MAC address of the wireless terminal device to the FDB 103a in the base station 100a from the wireless terminal device 200a which is not authorized for the registration to the FDB 103a in the base station 100a, the base station 100a transmits the FDB registration rejection frame (hereinafter referred to as REMOVE-MAC frame) to the wireless terminal device via the path b.

Figure 12:
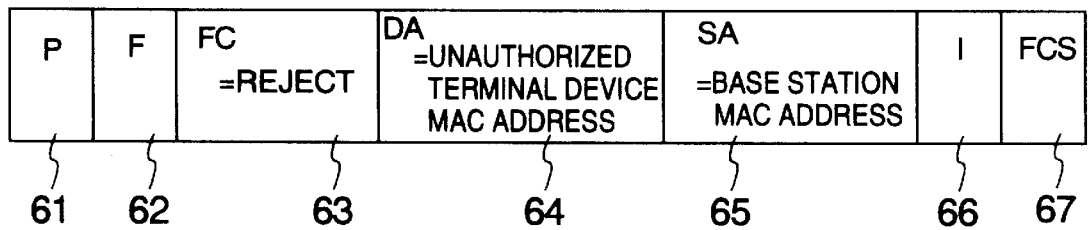
FIG. 12 shows a format of a reject to FDB registration frame.
Figure 13:
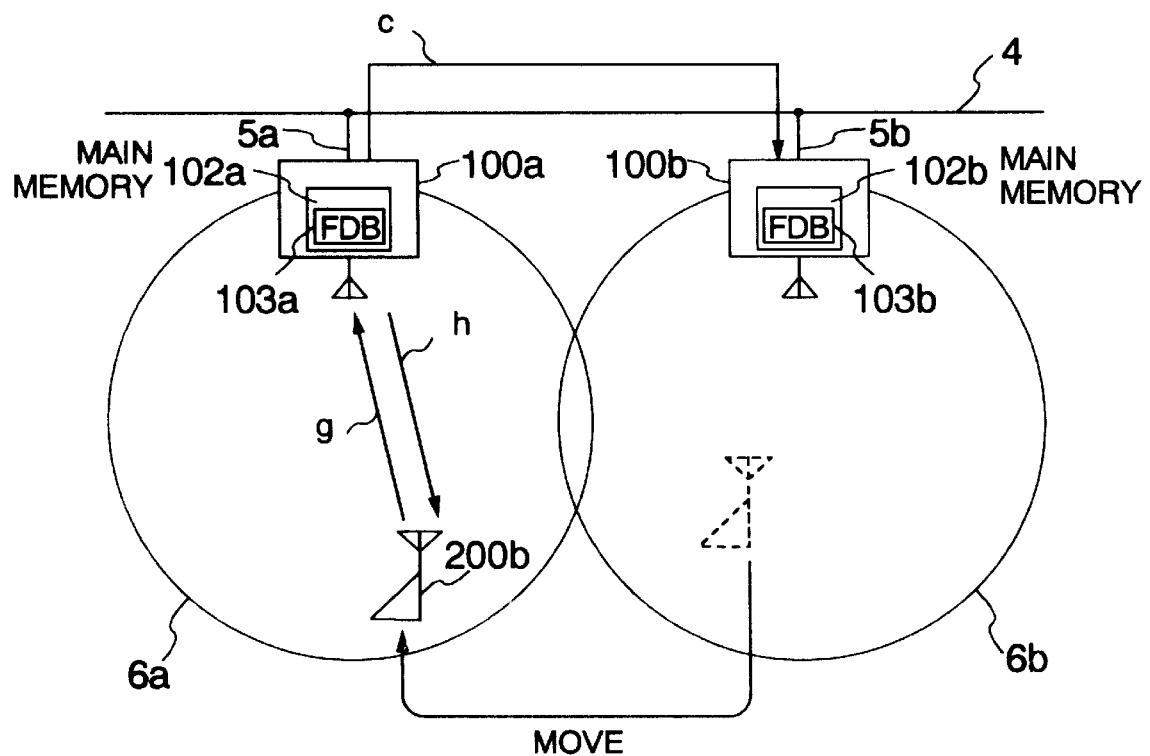
FIG. 13 illustrates an operation when a wireless terminal moves a cell.

As shown in FIG. 12, the REMOVE-MAC frame is a one of wireless control frames in which the addresses are set such that FC 63=reject, DA 64=MAC address of the unauthorized terminal and SA 65=MAC address of the base station 100a.

When the wireless terminal device 200a receives the REMOVE-MAC frame, the operation of the wireless modem unit 208 is locked by hardware or software to switch it to the wireless communication disabled state in the cell 6a. Alternatively, the power of the wireless terminal device may be shut off upon the reception of the REMOVE-MAC frame.

In this manner, the wireless terminal device is inhibited to enter into the cell 6a and the communication in the cell 6a is inhibited.

The inhibit state may be released by turning on the power of the wireless terminal device 200a at an appropriate time when a vacant state occurs in the FDB 103a. Alternatively, the system manager may be requested to increment the setting of the upper limit of the total number of MAC addresses registerable to the FDB 103a or to designate it as the wireless terminal device which is authorized for the registration to the FDB 103a and then the power of the wireless terminal device 200a may be turned on to release the inhibit state.

Referring to FIG. 3, the operation when the wireless terminal device 200b moves from the cell 6b established by the base station 100b to the cell 6a established by the base station 100a is explained.

When the base stations 100a and 100b and the wireless terminal device 200b are in the normal operation state, the MAC address of the wireless terminal device 200b is registered in the FDB 103b of the base station 100b.

When the wireless terminal device 200b moves from the cell 6b to the cell 6a, the wireless terminal device 200b receives the FH-MAC frame transmitted by the base station in the cell 6a via the path h and recognizes the entry to the cell 6a.

The wireless terminal device 200b transmits an FDB update control frame (hereinafter referred to as NP-MAC frame (1)) having the FDB update control information set in the field FC 63 of the frame of FIG. 6, the MAC address of the base station 100a set in the field DA 64 and the MAC address of the wireless terminal device set in the field SA 65 to the base station 100a.

When the base station 100a receives the NP-MAC frame (1), it extracts the MAC address of the wireless terminal device 200b and searches it from the FDB 103a.

Since the MAC address of the wireless terminal device 200b is not registered in the FDB 103a of the base station 100a, the MAC address of the wireless terminal device 200b is registered in the FDB 103a of the base station 100a.

Further, the base station 100a transmits the FDB delete frame (hereinafter referred to as DFDB frame) registered in the FDB 103a in the base station reaches which is a wired control frame to the base station 100b. The DFDB frame uses the frame format of FIG. 7 and transmits it through the wired transmission line 4 via the path c. In this case, the PTN 47, the TYP 48 and the DADR 49 are set in the information field I 45. The PTN 47 serves to discriminate the normal frame from the DFDB frame and may use a 802.2 LLC header which defines the SAP. The TYP 48 stores the information to command the deletion of the FDB and the DADR 49 stores the MAC address of the wireless terminal device which is to be deleted from the FDB 103 in the base station 100.

In the present embodiment, a DFDB frame (hereinafter referred to as DFDB frame (1)) having the MAC address of the base station 100b set in the DA 42, the MAC address of the base station 100a set in the SA 43, the DFDB frame identification information set in the PTN 47, the FDB delete command set in the TYP 48 and the MAC address of the wireless terminal device 200b set in the DADR 49 is used.

When the base station 100b receives the DFDB frame (1), it extracts the information of the DADR 49 (MAC address of the wireless terminal device 200b) and deletes the MAC address of the wireless terminal device 200b from the FDB 103b in the base station 100b. If the MAC address of the wireless terminal device 200b has not been registered in the FDB 103b in the base station 100b, the base station 100b does nothing. Even if the DFDB frame transmitted from the base station 100a does not reach the base station 100b, the MAC address of the wireless terminal device 200b is automatically deleted from the FDB 103b when the aging timer for the MAC address of the wireless terminal device in the FDB 103b in the base station 100b times out.

In this manner, when the wireless terminal device 200b moves into a different cell, it is informed from the destination base station to the source base station to delete the MAC address in the FDB in the source base station so that the transfer of the user frame to the destination cell is prevented and the efficient operation of the wireless transmission line is promoted.

In accordance with the present embodiment, the base stations 100a and 100b refer the MAC addresses stored in the FDBs 103a and 103b and relay only the user frames addressed to the wireless terminal devices having the MAC addresses thereof stored, among the user frames addressed to the wireless terminal devices 200a, 200b and 200c from the wired transmission line 4.

Accordingly, the user frames addressed to the wireless terminal devices which are not present in the cells 6a and 6b established by the base stations 100a and 100b are not relayed.

As a result, the relay transmission of the user frame from the wired transmission line 4 to the wireless transmission line in spite of the absence of the destination wireless terminal device in the wireless transmission line is prevented and the reduction of the transmission efficiency of the wireless transmission line is prevented.

Since the FDB update control frame is periodically transmitted from the wireless terminal device in the cell at the predetermined time interval, the occupation time of the wireless transmission line increases but since the amount of transmission of the user frames other than those addressed to the wireless terminal devices present in the wireless transmission line is usually much larger, the reduction of the transmission efficiency of the wireless transmission line by the transmission of the FDB update control frame at the predetermined time interval is negligibly small.

Further, for the wireless terminal devices having the MAC addresses thereof not registered to the FDBs 103a and 103b in the base stations 100a and 100b, the registration rejection frames are provided from the base stations 100a and 100b. Thus, the communication in the cell established by the base station 100a or 100b is inhibited.

Further, since the communication between the wireless terminal devices having the MAC addresses thereof not registered to the FDBs 103a and 103b in the base stations 100a and 100b is inhibited, the wireless terminal devices having the MAC addresses thereof registered may efficiently utilize the wireless transmission line and transmit the user frame.

Further, for the wireless terminal devices which are not authorized for the registration of the MAC addresses to the FDBs 103a and 103b, the entry to the cells 6a and 6b are inhibited so that the reduction of the integrity of security due to the unauthorized entry is prevented.

When the wireless terminal device 200a, 200b and 200c moves into a different cell, it is informed from the destination base station to the source base station to delete the MAC address in the FDB of the source base station so that the transfer of the user frame to the cell is the source base station is prevented and the efficient operation of the wireless transmission line is promoted.

In the above embodiments, the wireless LAN system of the type in which the carrier frequency is hopped up has been described although the present invention is directed to the manner to relay the user frame and the present invention is applicable to any wireless LAN system of any spread spectrum system such as a direct sequence system or a system using an infrared ray.

What is claimed is:

1. A base station device in a wireless LAN (Local Area Network) system comprising said base station device and a plurality of wireless terminal devices for transmitting and receiving data between said base station device and said wireless terminal devices and between said wireless terminal devices, comprising:

storage means for storing identification information of only the wireless terminal devices entering into a wireless LAN domain established by the base station device when an entry terminal identification information update control frame is received from the wireless terminal device;

delete means for deleting said identification information stored in said storage means after a predetermined time elapses from the writing; and transmission control means for relay-transmitting only an information frame addressed to the wireless terminal device having the identification information thereof stored by referring the information stored in said storage means when the information frame is received from a wired transmission line connected to the base station device.

2. A base station device in the wireless LAN system according to claim 1 further comprising:

transmission means for determining whether or not the number of identification information stored in said storage means has reached an upper limit when the entry terminal identification information update control frame is received, and when the number has reached the upper limit, transmitting a registration rejection frame of the identification information to a reception frame to the corresponding wireless terminal device.

3. A base station device in the wireless LAN system according to claim 1 further comprising:

transmission means for determining whether the identification information in a reception frame corresponds to the identification information of a preset registration authorized terminal device or a preset registration inhibited terminal device when the entry terminal identification information update control frame is received, and when the identification information is not allowed to be registered, transmitting a registration rejection frame to the corresponding wireless terminal device.

4. A wireless LAN system comprising a base station device and a plurality of wireless terminal devices for transmitting and receiving data between said base station device and said wireless terminal devices and between said wireless terminal devices;

said base station device comprising:

storage means for storing identification information of only the wireless terminal devices entering into a wireless LAN domain established by the base station device when an entry terminal identification information update control frame is received from the wireless terminal device;

delete means for deleting said identification information stored in said storage means after the elapse of a predetermined time from the writing; and transmission control means for relay-transmitting only an information frame addressed to the wireless terminal device having the identification information thereof stored by referring the information stored in said storage means when the information frame is received from a wired transmission line connected to the base station device;

said wireless terminal devices each comprising:

detection means for detecting the entry of its own device into a wireless LAN domain established by said base station device upon receiving the information frame from the base station device; and transmission means for periodically transmitting an entry terminal identification information update control frame including identification information of its own device at a predetermined time interval shorter than said predetermined time in accordance with the detection result by said detection means.

5. A wireless LAN system according to claim 4 wherein said detection means of said wireless terminal device receives a wireless control frame transmitted from said base station to detect the entry of its own device into the wireless LAN domain established by said base station.

6. A wireless LAN system according to claim 4 wherein said identification information is a MAC (media access control) address inherent to the system in each of said wireless terminal devices.

7. A wireless LAN system according to claim 4 wherein said base station device further comprising:

transmission means for determining whether the number of identification information stored in said storage means has reached an upper limit or not when the entry terminal identification information update control frame is received, and when the number has reached the upper limit, transmitting a registration rejection frame of the identification information to a reception frame to the corresponding wireless terminal device.

8. A wireless LAN system according to claim 7 wherein said wireless terminal device further comprising:

means for disabling the wireless communication of its own device upon the reception of the registration rejection frame.

9. A wireless LAN system according to claim 4 wherein said base station device further comprising:

transmission means for determining whether the identification information in a reception frame corresponds to the identification information of a preset registration authorized terminal device or not when the entry terminal identification information update control frame is received, and when the identification information does not correspond, transmitting a registration rejection frame to the corresponding wireless terminal device.

10. A wireless LAN system according to claim 5 wherein said base station device further comprising:

transmission means for receiving the entry terminal identification information update control frame from the wireless terminal device, and when the identification information of the corresponding wireless terminal device has not been registered in said storage means, transmitting an entry terminal identification information delete frame including the identification information of the corresponding wireless terminal device to other base station; and delete means for deleting the identification information stored in said storage means when the entry terminal identification information delete frame is received.

11. A method for relaying an information frame in a wireless LAN system having a base station device and a plurality of wireless terminal devices for transmitting and receiving data between said base station device and said wireless terminal devices and between said wireless terminal devices, comprising the steps of:

detecting in each of said wireless terminal devices the entry of its own device into a wireless LAN domain established by said base station device;

if entered, transmitting an entry terminal identification information update control frame including identification information of its own device to said base station device at a predetermined time interval;

receiving in said base station the entry terminal identification information update control frame from said wireless terminal device and storing in storage means the identification information of only the wireless terminal device entering into the wireless LAN domain established by the base station device; and relay-transmitting only an information frame addressed to the wireless terminal device having the identification information thereof stored in said storage means by referring the information stored in said storage means when the information frame is received.

12. A method for relaying an information frame according to claim 11 further comprising the step of:

determining whether the number of identification information stored in said storage means has reached an upper limit or not when the entry terminal identification information update control frame is received, and when the number has reached the upper limit, transmitting a registration rejection frame of the identification information to a reception frame to the corresponding wireless terminal device.

13. A method for relaying an information frame according to claim 11 further comprising the step of:

determining whether the identification information in a reception frame corresponds to the identification information of a preset registration authorized terminal device or not when the entry terminal identification information update control frame is received, and when the identification information does not correspond, transmitting a registration rejection frame to the corresponding wireless terminal device.

* * * * *